June 23, 1931. L. F. BAASH ET AL 1,810,938
TONGS
Filed March 18, 1930
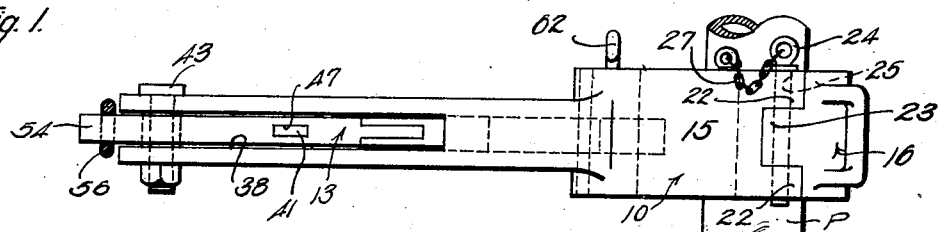
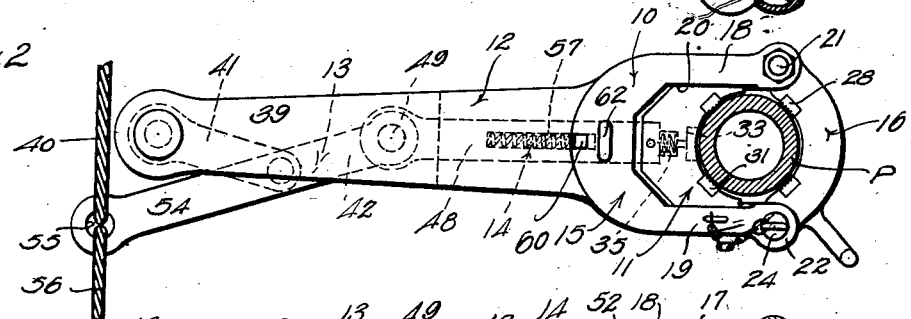
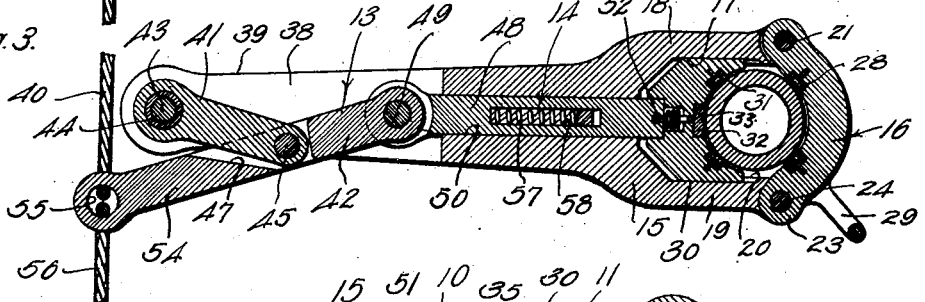
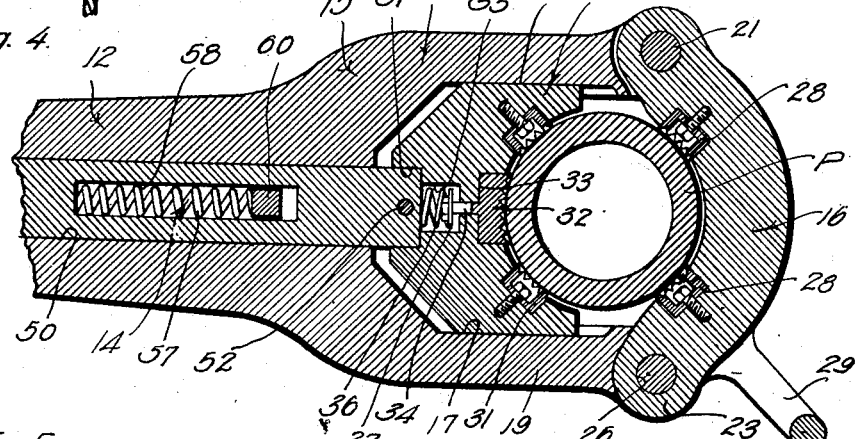
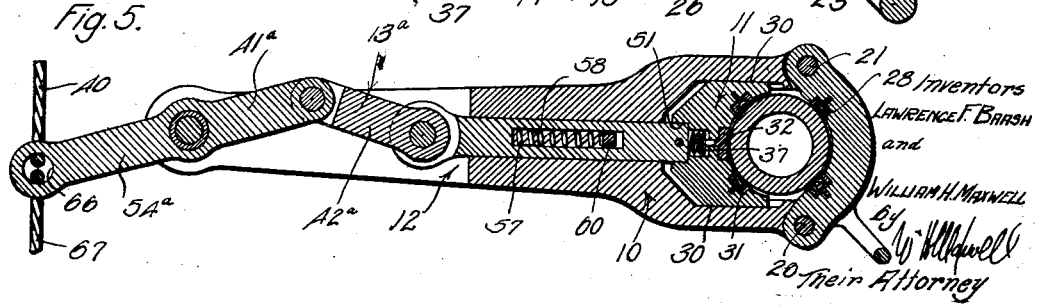

Patented June 23, 1931

1,810,938

UNITED STATES PATENT OFFICE

LAWRENCE F. BAASH, OF LOS ANGELES, AND WILLIAM H. MAXWELL, OF BEVERLY HILLS, CALIFORNIA

TONGS

Application filed March 18, 1930. Serial No. 436,694.

This invention relates to a tool for handling pipe, tubing, casing and like objects and relates more particularly to tongs for handling and gripping pipe or casing.

It is a general object of the invention to provide simple, sturdy, and practical tongs for effectively and securely gripping casing or the like.

The present invention relates to improved tongs of the general character fully described and claimed in our co-pending application entitled Tongs, Serial Number 436,693, filed March 18, 1930.

An object of this invention is to provide tongs for casing, or the like, which embody a gripping element or jaw carried by the casing encircling portion of the tool and operable by the operating line through an improved effective lever system.

It is another object of the invention to provide tongs which are well balanced and which are particularly easy to handle and operate. The mechanism for operating the gripping element of the tongs is carried so that it operates to counterbalance the head or pipe encircling portion of the tool.

A further object of the invention is to provide tongs formed of few simple parts that may be made sufficiently heavy to withstand hard usage and excessive strains without making the tool bulky or unwieldy.

Another object of the invention is to provide tongs having a jaw operating toggle mechanism carried by the handle, one lever of the mechanism being extended and being adapted to be engaged by an operating line.

Another object of the invention is to provide tongs of the character mentioned in which the extension of the toggle lever projects beyond the outer end of the handle.

Other objects and features of our present invention will be best and more fully understood from the following detailed description of preferred forms and applications of the invention, throughout which description reference is had to the accompanying drawings, in which:

Fig. 1 is a side elevation of one form of the tongs provided by this invention illustrating the tool in gripping engagement with a pipe. Fig. 2 is a top or plan view of the form of the invention illustrated in Fig. 1. Fig. 3 is a longitudinal detailed sectional view of the tongs. Fig. 4 is an enlarged detail sectional view of the head and pipe gripping portions of the tool, and Fig. 5 is a longitudinal detail sectional view of another form of the invention illustrating it in gripping engagement with a pipe.

The construction provided by our present invention is capable of embodiment in various types of tools for handling objects of various forms. Throughout the following disclosure we will describe two simple forms of our invention particularly adapted to handle pipe or casing and intended primarily to be actuated by means of operating lines. The forms of the invention about to be described are particularly suited for use in a well derrick for handling well casing, drill pipe, etc. The invention is not to be construed as limited to the particular forms of the invention about to be described nor by the application referred to above, but is to be taken as including any features or modifications that may fall within the scope of the claims.

The tong construction provided by this invention includes, generally, a head 10, a pipe gripping element 11 carried by the head, a handle 12, means 13 carried by the handle for operating the element 11 into gripping engagement with an object in the head 10, and means 14 for automatically returning the gripping element 11 to a retracted position after actuation.

The head 10 of the tongs is preferably such as to engage around the pipe and may be designed and proportioned to accommodate or handle pipes or objects of various sizes. In the drawings we have illustrated the head 10 engaging or encircling a pipe P. The particular head 10 shown in the drawings is formed of two main parts, namely, an inner or body part 15, and an outer part or gate 16.

The inner or body part 15 of the head carries the gripping element 11. The body part 15 of the head is yoked or U-shaped in its general configuration so that it has two spaced side parts 18 and 19 between which there is an opening 17 for carrying the element 11. The side walls 20 of the opening 17, which are the inner sides of the parts 18 and 19, are preferably made flat and parallel. The inner corners of the opening 17 may be made inwardly convergent as clearly illustrated in the drawings. The body part 15 of the head 10 may be a simple unitary member made sufficiently large and heavy to withstand the usage for which it is intended.

The outer part or gate 16 of the head 10 is in the nature of a closure for the open end of opening 17 of the body part 15. The gate 16 may be any suitable form of closure member and may be secured or attached to the part 15 in any suitable manner. In the particular case illustrated the gate 16 is a rigid unitary member pivotally connected with one of the side parts of the body 15. The gate 16 may be pivotally connected to the side part 18 by a pivot pin or bolt 21.

Any suitable form of releasable latch or holding means may be provided for releasably holding the gate in the closed position. In the case illustrated in the drawings the side part 19 is provided with spaced or yoked parts 22, and the outer or free end of the gate 16 is provided with a tongue 23 adapted to fit between the yoked parts 22. A removable latch or locking pin 24 may extend through openings 25 in the yoked parts 22 and an opening 26 in the outer end of the gate 16, the openings 25 and 26 being in register when the gate is swung to the closed position. The pin 24 may be attached to the body part 15 by a chain 27. It will be obvious that any suitable form or type of releasable catch or latch means may be provided for holding this gate closed.

The inner side of the gate 16 is preferably shaped to fit or seat against the pipe P and may be curved or rounded to conform to the configuration of the pipe. The gate 16 may be provided with gripping parts in the form of dies 28 seated in recesses in the inner side of the gate 16. A suitable handle 29 may be provided adjacent the outer end of the gate 16.

The gripping element 11 is in the form of a jaw for securely gripping the pipe P. In the construction illustrated the jaw is slidably carried in the opening 17 of the head. The gripping element 11 is carried in the opening 17 to move radially relative to the pipe P and is operable by the means 13 into gripping engagement with the exterior of the pipe. The element 11 may be a unitary rigid member shaped to effectively operate in the opening 17. The sides 30 of the gripping element 11 are preferably made flat and parallel to slidably operate on the walls 20 of the opening 17. The inner corners of the element 11 may be beveled or made inwardly convergent to conform to the shape of the inner portion of the opening 17. The outer or active end of the gripping element 11 is preferably curved to effectively engage the pipe P. Gripping parts or dies 31 may be provided at the outer end of the element 11 to engage the pipe P.

In accordance with the preferred form of our invention means is provided for resisting relative rotational movement between the element 11 and the pipe P prior to and during the start of actuation of the means 13 to ensure effective initial engagement between the element and the pipe P as operation of the tool is started. A spring pressed pipe engaging member 32 is arranged in a recess 33 in the active end of the element 11. The member 32 has a rearwardly projecting stem 34 slidable in an opening in the element 11 and projecting into an enlarged opening 35 in the element. A spring 36 is arranged under compression in the opening 35 to act against an enlargement 37 on the stem 34 to normally yieldingly urge the member 32 into a position where it projects from the active side of the element 11. The member 32 normally projects beyond the active face of the element 11 to engage the pipe P and its outer side is preferably provided with gripping parts in the form of teeth to grip the pipe.

The handle 12 carries the means 13 for operating the element 11 and is provided to facilitate the handling of the tool. The handle 12 projects outwardly or rearwardly from the body 15 of the head and is preferably made comparatively long. The handle 12 may be formed integral with the body 15. An opening 38 extends into the handle from its outer end to provide it with spaced side parts 39. The opening 38 is provided to carry the means 13 for operating the gripping element 11.

The means 13 for operating the gripping element 11 is directly operable by the operating line 40 to actuate the gripping element 11 into engagement with the pipe P and to hold the element 11 in gripping engagement with the pipe during the operation or turning of the tongs. The means 13 is preferably directly operated by the actuating line 40. The means 13 is in the nature of lever or toggle means and is housed or carried by the handle 12. In the form of the invention shown in Figs. 1, 2 and 3, the means 13 includes two pivotally connected links carried in the handle, an outer link 41 pivoted to the handle 12, and an inner link 42 operatively connected with the element 11. The outer end of link 41 is pivotally connected to the handle 12 by a pivot pin 43 extending between the parts 39 and through an opening in the outer end of the link. A suitable bushing 44 may be provided on the pin 43. The inner end of the link 41 is pivotally connected with the link 42 by means of a pivot pin 45. In the case illustrated the outer link 41 is provided with a reduced portion which extends into an opening 47 in the inner link 42. The inner end of the inner link 42 is pivotally connected with a stem or rod 48 which operatively connects the link with the gripping element 11. The link 42 may be pivoted to the outer end of the rod 48 by a pivot pin 49.

The rod 48 is slidable in an opening 50 in the handle 12 and projects into the opening 17 of the head where it is connected to the element 11. The rod 48 may extend into a socket 51 in the element 11. A locking pin 52 may lock the end of the rod 48 in the socket 51. The links 41 and 42 and the element 11 are related so that when the element 11 is in an unactuated or retracted position the links are in a position where they project outwardly or buckle outwardly at their point of pivotal connection. When the links 41 and 42 are operated toward a position where they are in alignment with the rod 48, the gripping element 11 is operated or forced into gripping engagement with the pipe P.

In accordance with the present invention a lever arm 54 is provided in connection with one of the links for operating the links to actuate the element 11.

In the form of the invention illustrated in Figs. 1 to 3 the lever arm 54 is provided on the inner link 42. The lever arm 54 is provided as a means for applying an operating force to the links. The lever arm 54 may be formed integral with the inner link 42 so that it projects or extends from the outer end of the link 42 to form a continuation of the link. The lever arm 54 may be made as long as desired, it being preferred to extend it to a point beyond the outer end of the handle 12. The outer end of the lever arm 54 is provided with means for connection with an operating member such as the actuating line 40. We have shown an opening 55 in the outer end of the lever arm 54 to carry the operating line 40. The opening 55 may also accommodate a return line 56. The lever arm 54 provides means for limiting the extent of inward movement of the links 41 and 42 as the outer wall of the opening 47, which is in the unit formed by the link 42 and the lever arm 54, is adapted to engage the outer link 41 to limit the inward movement of the levers.

The means 14 is provided for automatically returning the element 11 to its normal retracted position after actuation. The means 14 may be in the nature of spring means and may include a compression spring 57 arranged in an elongated transverse slot or opening 58 in the rod 48. The spring 57 is arranged between the outer end of the opening 58 and a bar or pin 60 arranged to extend transversely through the opening 58. The pin 60 may extend through the body part 15 of the head and extends through the inner end of the opening 58. The spring 57 is arranged between the outer end of the opening 58 and the pin 60 so that it is compressed upon actuation of the gripping element 11 and expands upon the gripping element 11 being released to return the element to its normal retracted position.

An eye bolt 62 may be provided on the head 10 for suspending or carrying the tool. The bolt 62 may project upwardly from what we will term the upper side of the tool.

In Fig. 5 of the drawings we have shown the means for operating the gripping element 11 as including an outer link 41ª pivoted to the handle 12 and pivotally connected with an inner link 42ª. In this form of the invention a lever arm 54ª is provided on the outer link 41ª for operating the links, while the inner link 42ª may terminate at or adjacent its point of pivotal connection with the link 41ª. In this form of the invention the lever arm 54ª may be formed integral with the outer link 41ª and may constitute an outwardly projecting continuation of the link. The lever arm 54ª projects from the outer end of the handle 12 and is provided at its outer end with means for connection with an operating line 40, or the like. We have shown the lever arm 54ª provided with an opening 66 for passing the line 40. A return line 67 may also pass through the opening 66. The links 41ª and 42ª are related to the gripping element 11 so that they are in the buckled or out position when the element 11 is retracted and are actuated inwardly or toward an aligned position when the arm 54ª is operated. The various other parts of the tongs illustrated in Fig. 5 of the drawings may be similar to the parts of the tool described above.

It is believed that the utility and practicability of the construction provided by our present invention will be readily apparent from the foregoing detailed description. It is to be noted that the invention provides tongs which are particularly simple and sturdy in construction and which are adapted to dependably and effectively handle pipe and like objects. Upon actuation of the line 40 the means 13 operates to force the gripping element or jaw 11 into secure engagement with the pipe and maintains the jaw in tight gripping engagement with the pipe during the turning of the tongs. The links 41 and 42 and the other parts of the operating means 13 may be made sufficiently heavy to effectively withstand hard usage. It will be obvious from the foregoing description that parts of this tool such as the head 10, the gripping element 11, and the handle 12, may be varied widely in form and construction without departing from the present invention.

The parts of the tool may be proportioned and related so that the gripping element 11 has a substantial range of movement so that the tool is adapted to handle objects varying considerably in size. The lever arm 54 may be extended or proportioned to provide the necessary leverage on the toggle mechanism for operating the element 11 into gripping engagement with various sizes of objects with the necessary force. For instance, a single tool may be made to effectively operate on pipe and also couplings or tool joints, or the like on the pipe. When the toggle links are well out of alignment with the rod or stem, the stem is moved a substantial amount when the links are operated. However, as the amount of travel of the rod or stem is increased, the leverage or power of the toggle mechanism is decreased.

Having described only typical preferred forms of our invention, we do not wish to limit ourselves to the specific details set forth, but wish to reserve to ourselves any changes or variations that may appear to those skilled in the art or fall within the scope of the following claims.

Having described our invention, we claim:

1. Tongs of the character described including, a pipe encircling head, a gripping element slidably carried in the head, a handle projecting from the head, and means for operating the gripping element including, two pivotally connected links, one link pivoted at the outer end of the handle, the other link connected with the element, and an operating lever arm on one link projecting from the outer end of the handle for connection with tong operating member.

2. Tongs of the character described including, a pipe encircling head, a gripping element slidably carried in the head, a handle rigidly connected with the head, and means for operating the gripping element including, a member slidable in the handle and connected to the gripping element, two pivotally connected links, one link being pivotally mounted in the handle adjacent its outer end, the other link being pivoted to said member, and, a lever arm on one link projecting from the handle for actuation by a tong operating member.

3. A tool of the character described including, a pipe encircling head, a gripping element slidably carried in the head, a handle joined with the head, and means for operating the gripping element including, a rod slidable in an opening in the handle and connected to the gripping element, two pivotally connected links at the outer portion of the handle, one link being pivotally supported by the handle, the other link being connected to the rod, and a lever arm on one link.

4. Tongs of the character described including, a pipe encircling head, a gripping element slidably carried in the head, a handle rigidly joined with the head, and means for operating the gripping element including, a rod slidable in an opening in the handle and connected to the gripping element, two pivotally connected links within the handle, one link being pivotally mounted in the handle adjacent its outer end, the other link being connected to the rod, and a lever arm on one link projecting from the handle for connection with a tong operating line.

5. Tongs of the character described including a pipe encircling head, a gripping element slidably carried in the head, a rigid handle projecting from the head, and means for operating the gripping element including two pivotally connected links in an opening in the handle, one link being pivotally supported adjacent the outer end of the handle, the other link being connected with the gripping element, and an operating lever arm on one link and projecting beyond the end of the handle for engagement by a tong operating line.

6. Tongs of the character described including, a pipe encircling head, a rigid handle for the head, a gripping element slidably carried within the head, means for operating the gripping element including, a rod slidable in the handle and connected with the gripping element, two pivotally connected links in the handle, one link pivotally supported in the outer end of the handle, the other link being connected to the rod, and an operating lever arm on one link projecting beyond the handle for operation by a tong operating line, and spring means for returning the gripping element after operation.

7. A tool of the character described including, a pipe encircling head, a rigid handle for the head, a gripping element slidably carried in the head, means for operating the gripping element including, a rod slidable in the handle and connected with the gripping element, two pivotally connected links in the handle, one link pivotally supported in the outer end of the handle, the other link being connected to the rod, and an operating lever arm on one link, and means for returning the element after operation including a spring in an opening in the rod, and a part on the handle engaging the spring.

8. Tongs of the character described including, a pipe encircling head, a rigid handle for the head, a gripping element slidably carried in the head, means for operating the gripping element including, a rod slidable in the handle and connected with the gripping element, two pivotally connected links in the handle, one link pivotally supported in the outer end of the handle, the other link connected to the rod, and an operating lever arm on one link, projecting beyond the end of the handle and having means for connection with a tong operating member.

9. Tongs of the character described including, pipe encircling means including, a body having an opening, and a gate pivoted to the body adapted to close a side of the opening, a rigid handle projecting from the body, a gripping element slidable in the opening, and means for operating the element including, a rod slidable in the handle and connected to the element, two pivotally connected links, one link being pivotally supported by the handle adjacent its outer end, the other link being pivotally connected to the rod, a lever arm on one link projecting from the outer end of the handle, and means on the lever arm for connection with an operating member for turning the tongs.

In witness that we claim the foregoing we have hereunto subscribed our names this 14th day of March, 1930.

LAWRENCE F. BAASH.
WILLIAM H. MAXWELL.